United States Patent [19]
Ecclesine

[11] Patent Number: 5,774,745
[45] Date of Patent: Jun. 30, 1998

[54] METHOD AND APPARATUS FOR WRITING AND READING ENTRIES IN AN EVENT STATUS QUEUE OF A HOST MEMORY

[75] Inventor: Peter Ecclesine, Livermore, Calif.

[73] Assignee: Cirrus Logic, Inc., Fremont, Calif.

[21] Appl. No.: 414,467

[22] Filed: Mar. 31, 1995

[51] Int. Cl.$^6$ ............................................. G06F 3/00
[52] U.S. Cl. .......................................... 395/872; 395/487
[58] Field of Search ................................. 395/872, 877, 395/486–487, 250

[56] References Cited

U.S. PATENT DOCUMENTS

| | | | |
|---|---|---|---|
| 4,482,956 | 11/1984 | Tallman | 395/736 |
| 4,592,019 | 5/1986 | Huang et al. | 365/78 |
| 4,740,914 | 4/1988 | Abrant et al. | 395/200.07 |
| 4,864,532 | 9/1989 | Reeve et al. | 395/250 |
| 4,899,307 | 2/1990 | Lenoski | 365/78 |
| 4,905,184 | 2/1990 | Giridhar et al. | 364/900 |
| 5,042,007 | 8/1991 | D'Luna | 365/78 |
| 5,043,981 | 8/1991 | Firoozmand et al. | 370/85.1 |
| 5,097,442 | 3/1992 | Ward et al. | 365/78 |
| 5,136,582 | 8/1992 | Firoozmand | 370/85.1 |
| 5,163,132 | 11/1992 | DuLac et al. | 395/275 |
| 5,210,749 | 5/1993 | Firoozmand | 370/85.1 |
| 5,214,786 | 5/1993 | Watanabe et al. | 395/800 |
| 5,247,626 | 9/1993 | Firoozmand | 395/250 |
| 5,301,192 | 4/1994 | Henrion | 370/94.1 |
| 5,317,692 | 5/1994 | Ashton et al. | 395/250 |
| 5,319,752 | 6/1994 | Petersen et al. | 395/250 |
| 5,404,522 | 4/1995 | Carmon et al. | 395/650 |
| 5,408,468 | 4/1995 | Petersen . | |
| 5,432,908 | 7/1995 | Heddes et al. | 395/250 |
| 5,434,976 | 7/1995 | Tan et al. | 395/200.07 |
| 5,454,095 | 9/1995 | Kraemer et al. | 364/431.05 |
| 5,459,839 | 10/1995 | Swarts et al. | 395/650 |
| 5,513,139 | 4/1996 | Butler | 395/189.04 |
| 5,572,698 | 11/1996 | Yen et al. | 395/437 |
| 5,574,885 | 11/1996 | Denzel et al. | 395/492 |

*Primary Examiner*—Jack B. Harvey
*Assistant Examiner*—David A. Wiley
*Attorney, Agent, or Firm*—Frank D. Nguyen; Lowe, Price, LeBlanc and Becker

[57] ABSTRACT

A computer system that has a bus is provided with a host memory coupled to the bus, this host memory having an event status queue in which events are stored. A peripheral controller is coupled to the bus and writes a termination marker in a first block in the memory and events occurring in the computer system in blocks in the event status queue in a first direction beginning with a block adjacent to the first block. A host processor is also coupled to the bus. The host processor reads the written events in a second direction opposite to the first direction beginning with a last block in which an event was written by the peripheral controller. The host processor terminates the reading of events when the first block in which the termination marker is reached. The use of a termination marker allows both the hardware of the peripheral controller and the software run by the host processor to operate in the event status queue at the same time, with no danger of running over each other.

18 Claims, 4 Drawing Sheets

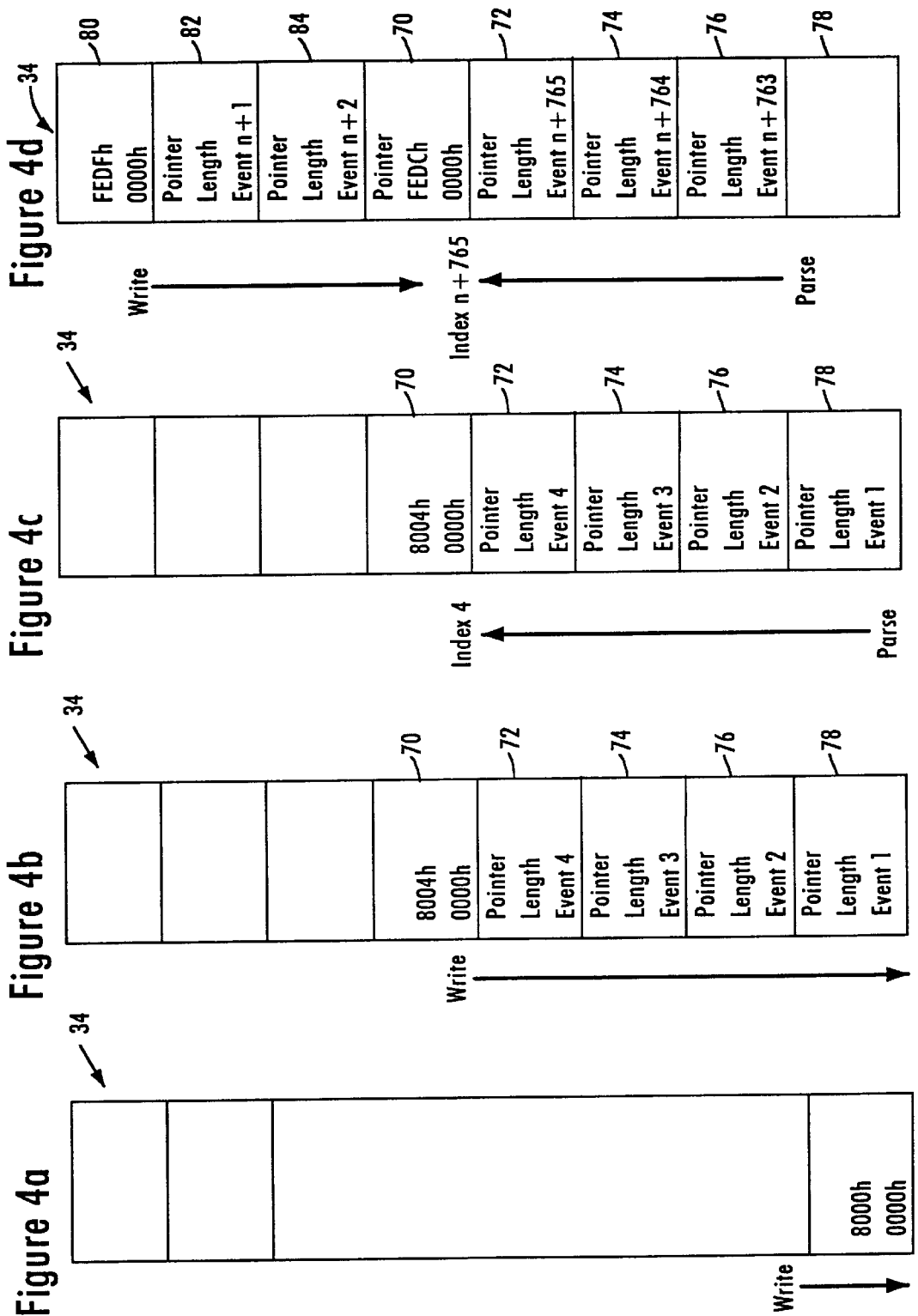

METHOD AND APPARATUS FOR WRITING AND READING ENTRIES IN AN EVENT STATUS QUEUE OF A HOST MEMORY

BACKGROUND OF THE INVENTION

1. Technical Field of the Invention

The present invention relates to the field of computer systems, and more particularly, to a queue system for storing information.

2. Description of Related Art

In computer systems, electronic chips and other components are connected with one another by buses. A variety of components can be connected to the bus, providing intercommunication between all of the devices that are connected to the bus. One type of bus which has gained wide industry acceptance is the industry standard architecture (ISA) bus. However, high-speed input devices commonly used in computer systems require faster buses. A solution to the general problem of sending and receiving data from the processor to any high input device is a local bus.

Unlike the ISA bus, which operates relatively slowly with limited bandwidth, a local bus communicates at system speed and carries data in 32-bit blocks. Local bus machines remove from the main system bus those interfaces that need quick response, such as memory, display, and disk drives. One such local bus that is gaining acceptance in the industry is the peripheral component interconnect (PCI) bus. The PCI bus can be a 32 or 64-bit pathway for high-speed data transfer. Essentially, the PCI bus is a parallel data path provided in addition to an ISA bus. The system processor and memory can be attached directly to the PCI bus, for example. Other devices such as graphic display adapters, disk controllers, sound cards, etc. can also attach directly or indirectly (e.g., through a host bridge) to the PCI bus.

In a digital computer, a microprocessor (or "host processor") operates on data stored in a main memory. Since there are practical size limitations on the main memory, bulk memory storage devices are provided in addition to and separately from the main memory. When the host processor wants to make use of data stored in bulk storage, for example, a hard disk, the data is moved from the hard disk into the main memory. This movement of blocks of memory inside the computer is a very time consuming process and would severely hamper the performance of the computer system if the host processor were to control the memory transfers itself.

In order to relieve the host processor from the chore of controlling the movement of blocks of memory inside the computer, a direct memory access (DMA) controller is normally used. The DMA controller receives information from the host processor as to the base location from where bytes are to be moved, the address to where these bytes should go, and the number of bytes to move. Once it has been programmed by the host processor, the DMA controller oversees the transfer of the memory data within the computer system. Normally, DMA operations are used to move data between input/output (I/O) devices and memory.

Many computer systems use a system network monitoring program (SNMP) that aids in the control of the computer system. In a typical system, each node or device is required to account for a number of variables that can be read out, these variables being indicative of conditions or status. The monitoring program reads the variables into designated locations in a host memory of the computer system where a host processor can retrieve and operate on the variables. The host processor often employs a totalizer that maintains a running total on conditions associated with events that occur in the network. As an example, when a frame of data is a "transmit frame" on the network, the number of "collisions" this frame had is monitored and stored by the SNMP into the host memory. The totals provided by the totalizer can be used by the host processor to perform flow control in the network, for example. The introduction of new frames into a network may be based on the status of previous frames, for instance, as determined by the host processor based on the accumulated totals.

There is data, which includes the status or conditions, that are associated with the events that occur in the system. These events can include a receive event, a transmit event, a buffer event, a counter event or a time domain reflectometer event that occurs, for example, in ethernet applications. The data associated with the events is placed in some location in the host memory under the control of a DMA controller, or peripheral controller. Descriptors that identify the event and the location of the data in the host memory are stored in an event status queue in the host memory. The host processor, through software, will examine the contents of the event status queue when the host processor receives an interrupt signal. Based on the descriptors and the data, the host processor will respond appropriately to these events through software.

When a PCI bus is used as the local bus, reads and writes by the peripheral controller on the bus to and from the host memory are only efficiently performed in an incrementing fashion. This is due to the same pathway being used for both addresses and data. Performing reads and writes in an incrementing fashion allows one address to be provided over the bus followed by a number of words of data that are stored in incremented address locations. If incrementing were not used, a new address would need to be asserted for each new data word.

It is desirable for the event status queue to be accessible by both the hardware (the peripheral controller) and the software (run by the host processor) at the same time. This is a problem, however, in that the software needs to know which events it is supposed to examine, and the hardware needs to know where to place the events in the event status queue. It is necessary that the software not read from locations that have not been completely written by the hardware. The use in other schemes of an ownership bit in the stored data words that signifies whether the hardware or software is allowed to read or write the data location has complications. For example, to get the bit set and cleared, a read modify write would need to be performed. If a read and modify was being attempted at the same time as a write, there would be a conflict and a failure. Other schemes, in which the hardware and the software communicate with each other, such as with a handshaking protocol, are inefficient due to the overhead required by the handshaking.

SUMMARY OF THE INVENTION

There is a need for a method and apparatus for managing the writing and reading of entries of events occurring in a computer system in an event status queue which allows the software and the hardware to operate at the same time in the event status queue without danger of conflict and with a minimal amount of communication between the hardware and the software.

This and other needs are met by the present invention which provides a method of writing and reading entries of events occurring in a computer system in an event status queue divided into blocks, comprising the steps of providing a termination marker in a block of the event status queue, the block that contains the termination marker being a termination block. A first set of event entries is written in a first direction in the event status queue in blocks starting from a block that is adjacent to the termination block. The first set of event entries in the blocks of the event status queue are read in a second direction opposite to the first direction. The reading of the event entries is terminated when the termination block is reached.

The use of a termination marker in the present invention allows both the hardware and the software to operate in the event status queue at the same time, with no danger of running over each other. In other words, the termination marker prevents the software from reading the event entries beyond the termination marker. This ensures the completion of the writing of the event entries in the event status queue by the hardware prior to the software attempting to read the event entries. Conversely, the termination marker prevents the hardware from overwriting event entries in the status queue that have not yet been read by the software.

The earlier stated needs are met by another aspect of the present invention which provides a computer system comprising a bus, a host memory coupled to the bus and having an event status queue in which events are stored, and a peripheral controller coupled to the bus. The peripheral controller writes a termination marker in a first block in the memory. The peripheral controller also writes events in blocks in the event status queue in a first direction beginning with a block adjacent to the first block. A host processor is coupled to the bus and reads the written events in a second direction opposite to the first direction beginning with a last block in which an event was written by the peripheral controller. The host processor terminates its reading of events when the first block in which the termination marker is written is reached.

The writing of a termination marker by the peripheral controller, and the host processor respecting the termination marker by terminating its reading of events, provides an elegant way to allow both the peripheral controller and the host processor to operate in the event status queue at the same time. The use of the termination marker eliminates the need for an ownership bit associated with data, or for communication between the peripheral controller and the host processor with respect to use of the event status queue.

The foregoing and other features, aspects and advantages of the present invention will become more apparent from the following detailed description of the present invention when taken in conjunction with the accompanying drawings.

BRIEF DESCRIPTION OF THE DRAWINGS

FIGS. 4a–4d depict an event status queue during different stages of operation according to the present invention.

DETAILED DESCRIPTION OF THE ILLUSTRATIVE EMBODIMENTS

Figure 1:
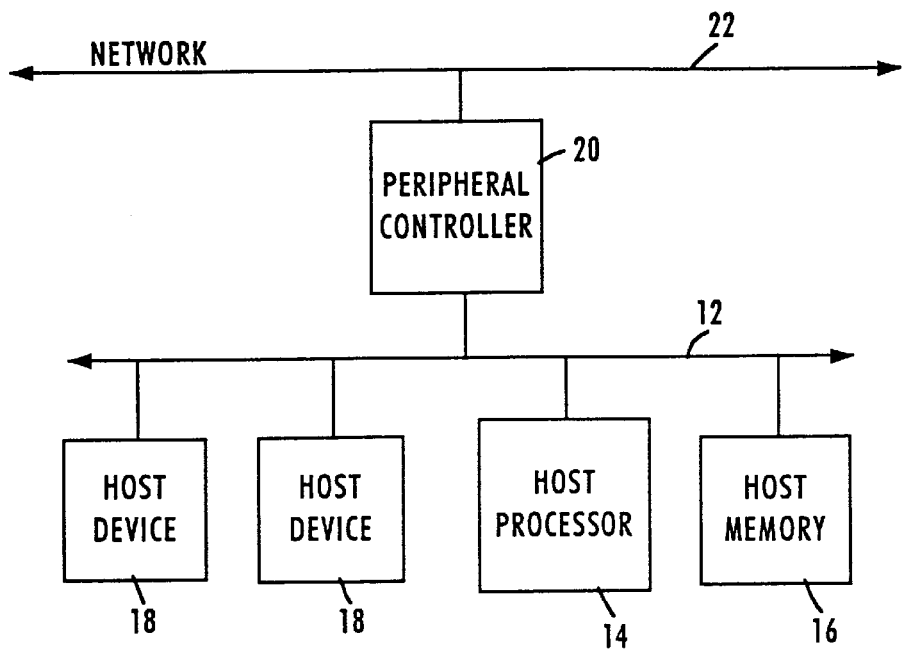
FIG. 1 is a block diagram of a computer system constructed in accordance with an embodiment of the present invention.

FIG. 1 is a block diagram of a computer system 10 constructed in accordance with an embodiment of the present invention. The system 10 includes a bus 12, such as a peripheral component interconnect (PCI) bus, for example, although the invention is useful in systems which employ other types of buses. A host processor 14 and a host memory 16 are coupled to the bus 12, as are a number of host devices 18.

The devices on the bus 12 are coupled to a network 22 by a peripheral controller 20 connected between the network 22 and the bus 12. The peripheral controller 20 acts as a direct memory access (DMA) controller by periodically polling a control table and moving frames of information across the bus 12 according to the information in the control table.

In operation of the system, the host processor 14, under the direction of software, will load a control table in the peripheral controller 20 with the information required to perform a transfer of frames of data. This transfer will be performed between one of the host devices 18 and the host memory 16 for example. Once the control table is loaded by the host processor 14, the peripheral controller 20 will perform the desired transfer without further intervention from the host processor 14. This frees the host processor 14 to perform other processing tasks.

Figure 2:
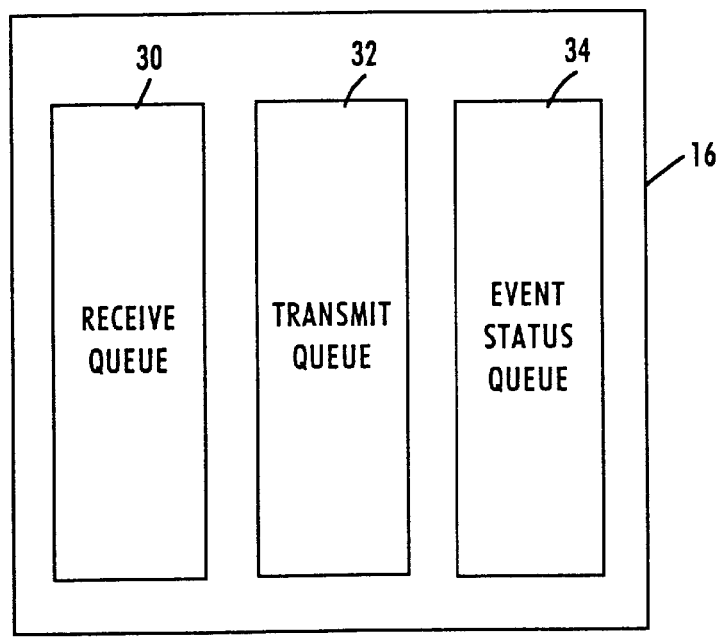
FIG. 2 is a block diagram of an exemplary embodiment of a host memory.

An embodiment of the host memory 16, as depicted in FIG. 2, has a receive queue 30, a transmit queue 32, and an event status queue 34. When data is to be moved by the peripheral controller 20 from a host device 18 into the host memory 16, for example, the data is placed into the receive queue 30. In preferred embodiments of the invention, the receive queue 30 is implemented as a strict circular buffer. Each of the separate blocks in the receive queue 30 represent frames of data in incremented order. The number "n+1", "n+2", etc. in each frame represents the frame number.

The transmit queue 32 contains data that the peripheral controller 20 has gathered with the header information for the frames of data, including the destination and the length of the data. Each frame contains a transmit command that allows the use of linked-list descriptors, gathered data, and circular queue operations in all combinations. Three different bits of the transmit command are used to provide eight different types of descriptors (or "transmit structures"). These three bits are: (1) E, representing the end of the data frame; (2) B, representing a branch chain pointer; and (3) A, representing an additional data pointer. A description of how these bits are used to provide the different transmit structures that are stored in the transmit queue 32 will now be provided using FIGS. 3a–d.

Figures 3A, 3B:
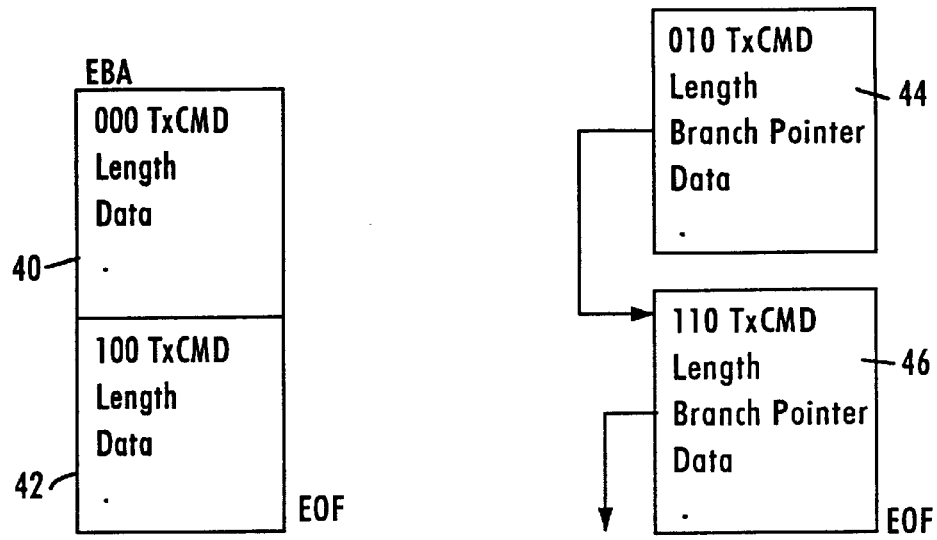
FIGS. 3a–3d are block diagrams of transmit structures according to the present invention.

In FIG. 3a, two frames 40, 42 stored in the transmit queue 32 are depicted. In frame 40, the bits corresponding to bits EBA in the transmit command have a value of "000". When bit E is set to 0, as here, this indicates that the end of the data is not the end of the frame. When bit B is set to 0, it means that there is no branch pointer in the frame. When bit A is set to 0, there is no additional data pointer. Each frame contains an indication of the length of the frame, and then the data follows this length indication.

Since bits EBA are set to 0 in frame 40, a circular queue arrangement is provided. The frame 42 that is contiguous to frame 40 is then considered to be a continuation of the frame. Bits EBA are set to "100" in frame 42. This indicates that the end of the data in this frame represents the end of the frame.

FIG. 3b depicts an example of chained descriptors and data. In frame 44, bits EBA are set to "010", indicating that the end of the data is not the end of the frame, that there is a branch pointer, and that there is no additional data pointer. The frame 44 therefore contains, in addition to a length indication and data, a branch pointer that points to another frame 46.

The value of the EBA bits of the transmit command in frame 46 are set to "110", which indicates that the end of the data represents the end of the frame, that the frame contains a branch pointer to another frame, and that there is no additional data pointer.

Figure 3C:
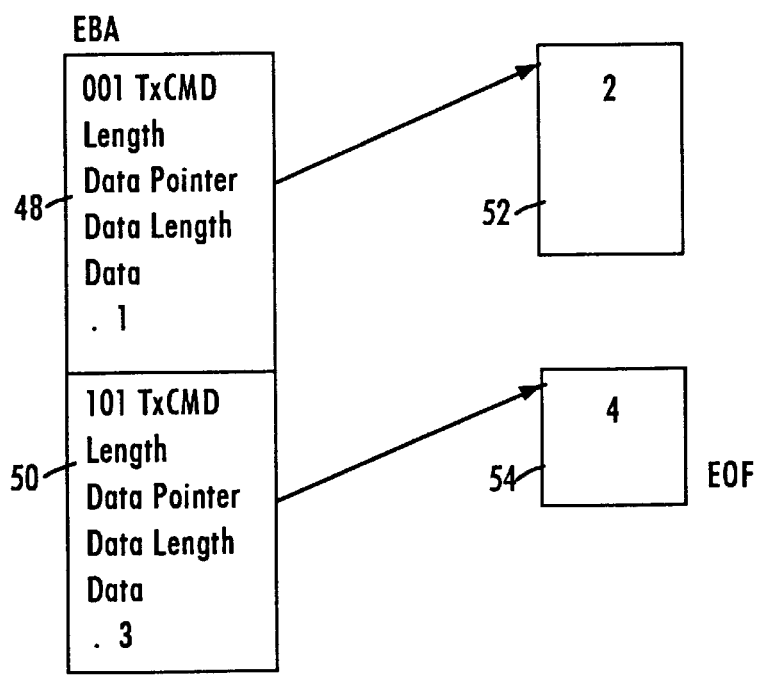

An example of the use of the EBA bits to provide for circular queue descriptors and gathered data is depicted in FIG. 3c. The EBA bits have the value of "001" in frame 48. This indicates that the end of the data is not the end of the frame, that there is no branch pointer, and that the frame contains an additional data pointer. The data pointer in frame 48 points to another location (52) in the transmit queue 32 where additional data related to this frame is located. The data length indicates the length of this additional data.

Since the E bit was not set, thereby forming a circular queue transmit structure, the frame continues with frame 50. The EBA bits in frame 50 are set to "101", indicating that the end of the data represents the end of the frame, there is no branch pointer, and that there is an additional data pointer. The data pointer points to location 54 in the transmit queue 32, where the additional data for this frame is located. The end of the data in location 54 represents the end of the frame.

Figure 3D:
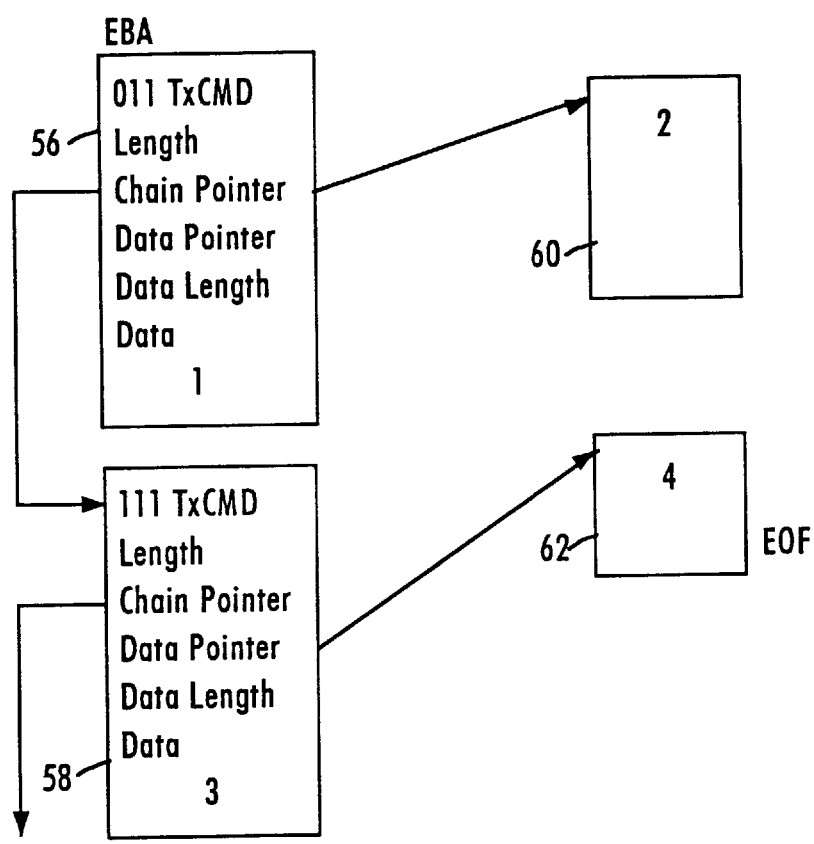

An example of the use of the EBA bits to provide for chained descriptors and gathered data is depicted in FIG. 3d. The EBA bits have the value of "011" in frame 56. This indicates that the end of the data is not the end of the frame, that there is a branch pointer, and that the frame contains an additional data pointer. The data pointer in frame 56 points to another location (60) in the transmit queue 32 where additional data related to this frame is located. The data length indicates the length of this additional data. The branch pointer points to frame 58 in the transmit queue 32 for the continuation of the frame after the data from location 60 is transmitted.

The EBA bits in frame 58 are set to "111", indicating that the end of the data represents the end of the frame, there is a branch pointer, and that there is an additional data pointer. The data pointer points to location 62 in the transmit queue 32, where the additional data for this frame is located. The end of the data in location 62 represents the end of the frame. The branch pointer points to another frame containing the next data that is to be transmitted.

The use of three bits in the transmit command structure allows eight different transmit structures to be formed in the transmit queue 32. These include linked-list descriptors, gathered data, and circular queue operations in all combinations.

FIGS. 4a–4d depict the contents of the event status queue 34 during different stages of operation. An "event" relates to the status that needs to be reported by the peripheral controller 20, such as a transmit completion, a receive with a CRC (cyclic redundancy check), a jabber timeout, or a miscounter overflow, as examples. Many of the events have data associated with the event that are then stored in the transmit queue 32 or the receive queue 30. The peripheral controller 20 needs to report events for the purpose of statistics and management of the interface between the bus 12 and the network 22 and for the purposes of moving data.

As will be described below, the present invention allows the software run by the host processor 14 that "parses" the events in the event status queue 34 to operate at the same time as the peripheral controller 20 (the "hardware") is writing events into the event status queue 34.

Assume initially that the event status queue 34 is nearly empty, as at initialization. This is depicted in FIG. 4a, in which only the lowest two words are written. The value '0000' h is a termination marker and the value '8000' h is a marker that indicates that the length of the number of events written is not a valid length.

In an exemplary embodiment of the present invention, the bus 12 is a PCI bus, over which writes and reads can only be performed in an incrementing fashion. The use of a termination marker according to the present invention allows both the software (implemented by the host processor 14) to read in an incrementing fashion and the hardware (the peripheral controller 20) to write in an incrementing fashion.

After initialization, assume that four events occur that the peripheral controller 20 needs to write into the event status queue 34. A write process will proceed in the manner depicted in FIG. 4b. The first block that is written in the event status queue 34 by the peripheral controller 20 is block 70. The length '8004' h is written in this block to indicate that there are four events that are being written into the event status queue 34. The peripheral controller also writes the termination marker '0000' h in block 70. The software will not proceed beyond this termination marker when it parses the events.

After writing the termination marker, the peripheral controller 20 continues the write process by writing the events in a first direction in the event status queue 34. In the exemplary embodiment, the events are written from the newest (most recent) event to the oldest event. In FIG. 4b, therefore, the first event written is the newest event, event 4. A pointer that points to a location in the host memory 16 where data associated with the event can be found, such as the transmit queue 32 or the receive queue 30, is written in this block 72. The length of the data for this event 4 is also written in this block 72.

The peripheral controller 20 then writes the remaining three events in blocks 74, 76 and 78 respectively. Event 1 is the oldest event and the event is written over the previous termination marker and length indication. The software, when it begins parsing, will now be able to read this block since the termination marker is removed. When the peripheral controller 20 completes its writing of the events in the event status queue 34, it asserts an interrupt request signal (IRQ) to the host processor 14.

Upon receiving the interrupt request signal from the peripheral controller 20, the host processor 14 begins parsing the event, beginning with the oldest event, event 1. This process is depicted by FIG. 4c. The host processor 14 always begins its parsing at the block at which the termination marker was previously located, block 78 in this example. The events are pulled out of the event status queue 34 one at a time in a second direction, opposite to the first direction in which the events were written, until the new termination marker is reached in block 70. The reaching of the termination marker indicates to the software being run by the host processor 14 that there are no more events to parse. The index 4 is then output as an address on the bus 12, which causes the peripheral controller 20 to drop (deassert) the interrupt request signal.

The writing and the parsing operations can be performed simultaneously, since there is no handshaking necessary between the software and the peripheral controller 20. The termination marker is used by the peripheral controller 20 as a reference so that it knows where it will stop writing events, and by the software as a reference so that it will know where it will stop parsing events. FIG. 4d depicts the simultaneous writing and parsing of the event status queue 34. In parsing, the software will stop parsing at block 70, which contains the termination marker. In writing, the peripheral controller 20 will eventually write the last (oldest) event in this block 70.

With the present invention, a plurality of events can be parsed without having to communicate with the peripheral controller chip 20 for each separate event.

Although the present invention has been described and illustrated in detail, it is clearly understood that the same is by way of illustration and example only and is not to be taken by way of limitation, the spirit and scope of the present being limited only by the terms of the appended claims.

I claim:

1. A method of writing and reading entries of events occurring in a computer system in an event status queue divided into blocks, the method comprising the steps of:

identifying a block of the event status queue as a termination block;

writing a first set of event entries in a first direction in the event status queue in blocks starting from a block that is adjacent to the termination block;

reading the first set of event entries in the blocks of the event status queue in a second direction opposite to the first direction beginning with a previous location at which a termination block was written; and terminating the reading of the event entries when the termination block is reached.

2. The method of claim 1, further comprising writing a second set of event entries in the event status queue in the first direction, wherein a last one of the event entries in the second set of event entries is written in the termination block.

3. The method of claim 2, further comprising writing a termination marker in a first block in the second set of event entries that is written in the event status queue.

4. The method of claim 3, further comprising reading the second set of event entries in the second direction, with the first block that is read containing the last one of the event entries written in the event status queue.

5. A computer system comprising:

a bus;

a host memory coupled to the bus and having an event status queue in which events are stored;

a peripheral controller coupled to the bus, the peripheral controller writing a termination marker in a first block in the memory and writing events in blocks in the event status queue in a first direction beginning with a block adjacent to the first block;

a host processor coupled to the bus, the host processor reading written events in the event status queue in a second direction opposite to the first direction beginning with an oldest unread block in which an event was written by the peripheral controller and terminating the reading of events when the first block in which a termination marker exsists is reached.

6. The computer system of claim 5, wherein the bus is a peripheral component interconnect (PCI) bus.

7. The computer system of claim 6, wherein the host processor includes means for parsing the events that are read by the host processor and responding to the parsed events.

8. The computer system of claim 5, wherein a first one of the events written in the event status queue is a most recent event in the computer system, and a last one of the events written is an oldest event in the computer system.

9. The computer system of claim 8, wherein a first one of the events read from the event status queue is the last one of the events written in the event status queue, and a last one of the events read from the event status queue is the first one of the events written in the event status queue.

10. The computer system of claim 8, wherein the peripheral controller includes means for writing an event in a block which contains a previous termination marker to thereby overwrite the previous termination marker.

11. A computer system comprising:

a bus;

a host memory coupled to the bus and having a transmit queue in which command information regarding data is stored in the transmit queue; and a peripheral controller coupled to the bus, the peripheral controller assembling blocks of data according to the command information in the transmit queue and transmitting the assembled blocks of information over the bus to a specified destination;

wherein the command information includes specific bits which indicate how the data is to be assembled by the peripheral controller.

12. The computer system of claim 11, wherein data is to be assembled in a circular queue structure.

13. The computer system of claim 12, wherein data is to be assembled is a linked-list structure.

14. The computer system of claim 13, wherein data is to be assembled is a gathered data structure.

15. The computer system of claim 11, wherein the command information is encoded as three bits of a command structure stored in individual blocks in the event status queue, the transmit structures being formed from the blocks in the event status queue.

16. The computer system of claim 15, wherein one of the bits is one of (1) an end bit which indicates whether an end of data in a block represents an end of a frame, (2) a branch chain pointer bit which indicates whether the block contains a branch pointer to another block, and (3) an additional data pointer which indicates whether the block contains a data pointer to another block where additional data is located.

17. A memory for storing data written into the memory by a controller for access by software being executed by a host processor in a computer system, comprising:

a data structure stored in said memory, said data structure including information regarding events occurring in the computer system, the data structure including:

a plurality of blocks for containing the information, each block having a capacity to contain the information for a different one of the events wherein the blocks are addressable in an incrementing manner by the controller and by the software;

a termination marker written by the controller in one of the blocks, with successive blocks containing the information for the events that are written by the controller in a first direction away from the block containing the termination marker, these successive blocks being accessed by the software in a second direction opposite to the first direction beginning with a previous location of a termination marker until the software detects a block containing the termination marker.

18. The memory of claim 17, wherein a second termination marker is contained in one of the blocks, and information regarding additional events are contained in the blocks written in the first direction until the software detects a block containing the first termination marker is reached, the block containing the first termination marker being overwritten by the controller with the information regarding one of the additional events.

* * * * *